United States Patent [19]
Nauta

[11] 3,746,314
[45] July 17, 1973

[54] APPARATUS FOR TREATING SUBSTANCES
[75] Inventor: Constant Johan Nauta, Overveen, Netherlands
[73] Assignee: Nautamix Patent A.G., Zug, Switzerland
[22] Filed: Jan. 4, 1971
[21] Appl. No.: 103,439

[52] U.S. Cl. .................................. 259/21, 259/102
[51] Int. Cl. ............................................. B01f 7/08
[58] Field of Search .................. 259/23, 24, 22, 21, 259/6, 5, 102, 103

[56] References Cited
UNITED STATES PATENTS
2,967,695    1/1961    Nauta ................................... 259/21
1,450,326    4/1923    Maitland .............................. 259/21
2,831,663    4/1958    Nauta ................................. 259/102

Primary Examiner—Robert W. Jenkins
Attorney—Arnold Robinson

[57] ABSTRACT

The present apparatus includes a vessel having at least one agitator that stirs and thereby agitates the contents. The bottom of the vessel is provided with a member adapted to agitate the contents and to inject substances into the vessel. Preferably the agitator in the bottom of the vessel generates a vortex motion in the contents of the vessel and a fluid may be injected into the vortex and mixed with the contents of the vessel.

11 Claims, 2 Drawing Figures

APPARATUS FOR TREATING SUBSTANCES

The present invention relates to apparatus for treating substances which is particularly adapted for mixing a fluid such as gas or a liquid with powdery or granular material. Homogenization of the two substances may be achieved especially when the vessel interior has an inverted frusto-conical configuration. To this end, the vessel is provided with at least one agitation means which for best results is eccentrically mounted to revolve about the center of the vessel to stir and thereby agitate the contents. The preferred agitation means comprise a screw type member that extends in a vertical direction adjacent the wall of the vessel and the screw type member is preferably rotated about its own axis while it simultaneously revolves about the vertical axis of the vessel.

The bottom of the vessel is provided with means for injecting substances into the vessel and preferably the means are adapted to agitate the contents adjacent to the injection means. The preferred means for this purpose comprise an agitator rotatably mounted in the bottom of the vessel to generate a vortex motion in the contents and gas or a fine spray of atomized liquid is injected by a nozzle into the whirling mass that surrounds the agitator. Best results are achieved when the injection with accompanying agitation take place above the path of the lower end of the agitator means that stir the contents.

In a preferred embodiment of the invention, a bushing is rotatably mounted in the bottom of the vessel and the injection nozzle is rotatably mounted in the bushing. At least one agitator is mounted on said nozzle or on said bushing or on both to generate a vortex motion in the contents of the vessel upon rotation of the nozzle or bushing. The most vigorous action is achieved when the nozzle and bushing are both provided with agitation means and the nozzle and bushing are independently rotated by separate drive means. In an alternative embodiment, a baffle plate is mounted above the opening in the nozzle and the plate is provided with agitation means capable of generating vortex motion in the convents of the vessel in the area of the agitation means.

These and other advantages and further details of preferred embodiments of the present invention may be readily understood by reference to the accompanying drawings in which.

Figure 1:
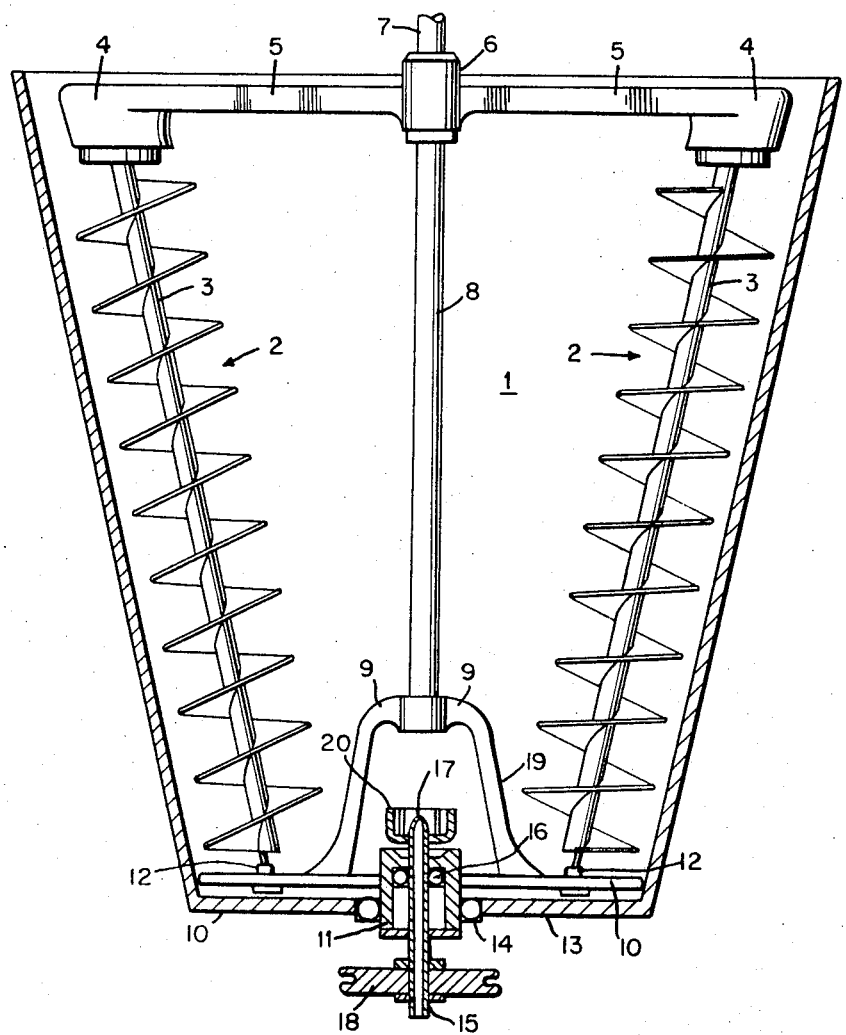
FIG. 1 shows diagrammatically a vertical axial section through a first preferred embodiment of the device according to the invention.

As shown in FIG. 1, a vessel 1 is preferably provided with external and internal peripheral surfaces that are of frusto-conical shape with a common vertical axis. The agitation means for stirring the contents of the vessel as shown in the drawing comprise two screw type members 2 each of which is disposed in the vessel diametrically opposite the other. The upper end of the shaft 3 of each mixing-screw is rotatably supported in the outer end 4 of a hollow support arm 5 which extends outwardly in radial direction from a common hollow bushing 6 to which each arm is fixed. The bushing 6 is fixed to a hollow drive shaft 7 which rotates the bushing to cause the screw type members to revolve about the vertical axis of the vessel to stir and agitate the contents. Conventional drive and gear means (not shown) inside the hollow arms rotate each of the screw type members 2 about its own axis while the screw simultaneously revolves about the vertical axis of the vessel. Rotation of the screws about their own axis increases the agitation and the mixing of the contents which tend to move in a vertical direction under the influence of the rotating screws.

A support rod 8 is fixed at its upper end to the underside of bushing 6 to extend downwardly into the vessel with the axis of the rod coinciding with the vertical axis of the vessel. The rod 8 is provided at its lower end with two carrying arms 9 each of which is arranged diametrically opposite the other. Each carrying arm 9 carries at its lower end a radially outwardly extending support arm 10 disposed in the vicinity of the bottom 13 of vessel 1 and fixed at the inner end to a bushing 11, rotatably mounted in the bottom of the vessel by means of a dust-proof bearing 14. Each support arm 9 together with the corresponding support arm 10 lies in one vertical plane with the corresponding support arm 5. The lower end of the shaft 3 of each mixing screw 2 is rotatably supported by a pin 12 fixed in the corresponding support arm 10. Rotation of the bushing 6 will cause the rod 8 to rotate the support arms 9, the support arms 10 and the bushing 11 about the vertical axis of the vessel 1 at the same speed of rotation as the support arms 5.

The bushing 11 is preferably mounted in the center of the bottom 13 of the vessel 1 with the axis of the bushing coinciding with the axis of the vessel. A bearing 16 mounted inside the bushing 11 supports means for injecting substances into the vessel such as the injection pipe or nozzle 15 which extends through openings in the top and bottom wall of the bushing. The outlet 17 of the injection nozzle is positioned inside the vessel above the bottom of the screw type members 2. A pulley 18 is fixed to the lower end portion of the injection nozzle means 15 and drive means (not shown) rotate the pulley 18 together with the injection nozzle 15 about the axis of the nozzle. The speed of rotation of the nozzle is entirely independent of the speed of rotation of the bushing 11. Conventional agitation means, such as a disc 19 having a plurality of upright projections or blades 20, are mounted on the upper end portion of the injection nozzle to rotate with the nozzle.

In operation, the nozzle 15 together with the agitation means rotate at a high speed to generate a considerable vortex motion in the contents of the vessel surrounding the end of the nozzle so that a substance which may be a gas or fine spray of liquid from a suitable supply source (not shown) may be readily sprayed into the whirling contents surrounding the nozzle. At the same time the screw type members 2 revolve at a very low speed of rotation about the vertical axis of the vessel 1 and simultaneously the shafts 3 of each screw type member is preferably rotated at a higher speed of rotation about its own axis.

Figure 2:
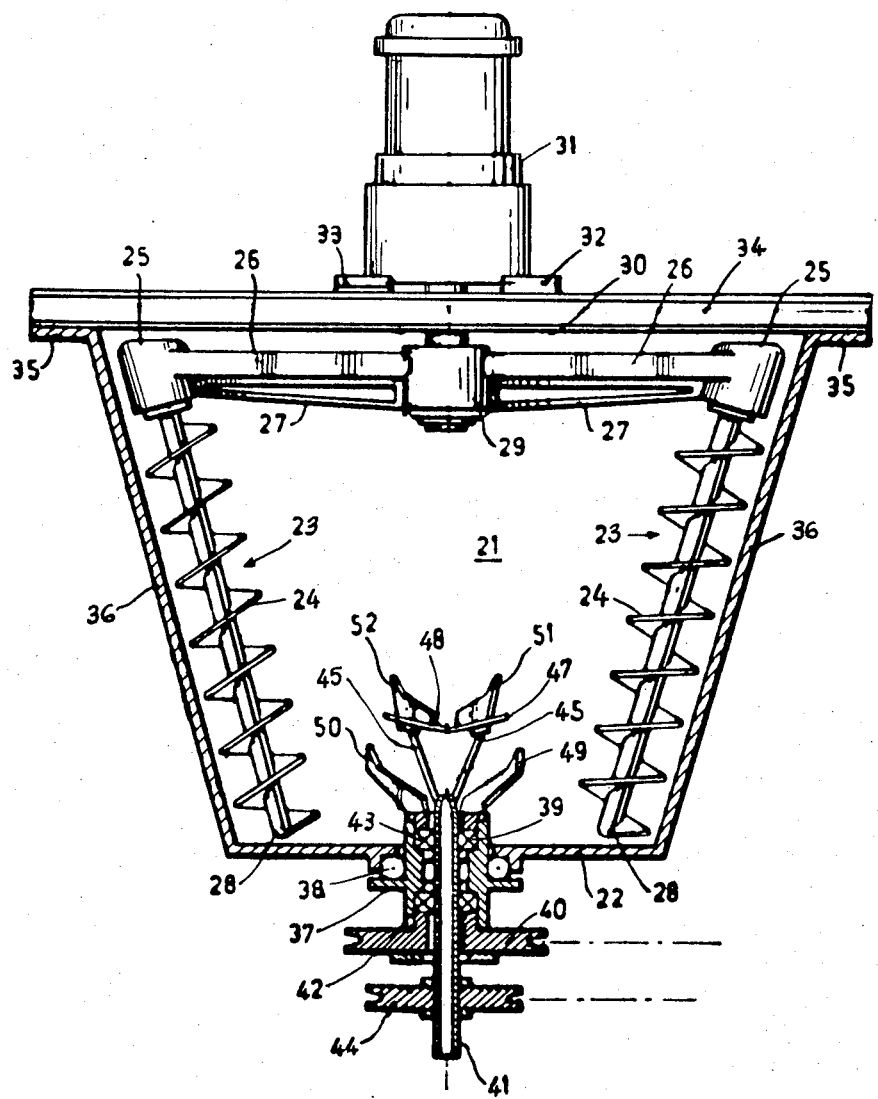
FIG. 2 shows diagrammatically a vertical axial section through a second preferred embodiment of the device.

In the second preferred embodiment shown in FIG. 2, the agitation means comprise two stirring-screws 23 which are eccentrically mounted in the vessel 21 diametrically opposite each other. The vessel has a bottom 22 with a comparatively large cross-section. The upper end of the shaft 24 of each stirring-screw 23 is rotatably supported in the outer end 25 of a radial hollow support arm 26 provided with a stiffening girder 27. Each support arm 26 is fixed to a hollow bushing 29 that is in turn fixed to a hollow drive shaft 30 of a conventional drive apparatus 31. The axis of shaft 30 coincides with the axis of the vessel 21. The lower unsupported end 28 of the shaft 24 of each stirring-screw 23 is positioned adjacent the bottom 22 of the vessel 21 eccentrically with respect to the vertical axis of the vessel 1. The drive apparatus 31 is carried by means of two support plates 32 and 33 which rest on two U-shaped girders crossing the open top of the vessel 1. One girder 34 is visible in FIG. 2. The girders are supported on the upper flange 35 of the side wall 36 of the vessel 21. Conventional drive and gear means (not shown) in the hollow shaft 30 and arms 26 are employed for rotating each shaft 24 of the stirring-screws about its own axis.

In operation, the drive apparatus 31 rotates the hollow shaft 30 together with the bushing 29 to cause the support arms 26 and the stirring-screws 23 to revolve about the vertical axis of the vessel 21 and simultaneously each stirring-screw 23 rotates about its own axis.

A bushing 37 is rotatably mounted by means of a bearing 38 in an opening 39 in the center of the bottom 22 of the vessel. The bushing 37 is inwardly spaced from the unsupported lower ends of the stirring-screws 23, and the bushing extends up into the interior of the vessel. A pulley 40 is fixed to the lower end of the bushing 37. The means for injecting substances and for agitating the contents of the vessel comprise a nozzle 41 rotatably mounted in the bushing by means of bearings 42 and 43. The nozzle extends through bushing 37 and the opening 45 at the top of the nozzle is positioned inside the vessel above the lower end of the stirring-screws 23. A pulley 44 is fixed to the lower end of the injection nozzle. A pair of rods 46 and 47 attached to the nozzle carry a baffle plate 48 which is in position spaced upwardly above the spray hole 45. Two vortex-wings or blades 49 and 50 are secured to the bushing 37 and in the preferred embodiment, two vortex blades 51 and 52 are secured to the baffle plate 48. Drive means (not shown) rotate the pulleys 40 and 44.

In operation, the bushing 37 and the injection nozzle 41 rotate about their common longitudinal axis which coincides with the axis of the vessel 21. The speed of rotation of the bushing 37 is entirely independent of the speed of rotation of the injection nozzle 41 and if desired, the speed of rotation of each one may differ considerably. A substance such as a gas or spray of liquid from a suitable source of supply (not shown) may be injected into the whirling vortex generated by the rotating vortex blades in the substance surrounding the nozzle outlet.

For the sake of clearness certain details such as the outlet means for the finished product are not shown.

It will be understood that the number and the shape of the stirring members and the number and the shape of the vortex blades and the means for driving the injector may all be varied. In particular, more than one complete injection and agitation member can be mounted in the bottom of the vessel and each of said members may be arranged eccentrically in respect of the axis of the vessel.

It will be understood that the following claims are intended to cover all changes and modifications of the preferred embodiment of the invention, herein chosen for the purpose of illustration, which do not constitute a departure from the spirit and the scope of the invention.

What is claimed is:

1. Apparatus for treating substances which comprises a vessel, agitation means and means located adjacent the bottom of said vessel for injecting substances into the vessel and for agitating the contents thereof in the area of said injection in which the injection and agitation means comprise a nozzle rotatably mounted in the bottom of the vessel for injecting a spray of fluid into the vessel, said nozzle having at least one agitator mounted thereon for agitating the contents of the vessel to generate a vortex motion therein and drive means for rotating said nozzle.

2. The structure specified in claim 1 in which the injection and agitation means located adjacent the bottom of the vessel extend inwardly through the bottom of the vessel to a position above one end of said agitation means.

3. The structure specified in claim 1 in which the agitator extends inwardly into the vessel beyond the open end of the nozzle.

4. The structure specified in claim 1 in which at least one agitator is rotatably mounted to revolve about said nozzle.

5. The structure specified in claim 1 in which a baffle plate is mounted on the nozzle above the opening therein, and at least one agitator is mounted on said baffle plate.

6. Apparatus for treating substances which comprises a vessel, at least one agitator mounted eccentrically in said vessel, means for revolving said agitator about the center of the vessel and for simultaneously rotating said agitator about its own axis, agitation means located adjacent the bottom of said vessel and injection means for injecting a substance into the vessel adjacent the bottom thereof, said agitation means and injection means being located inside the path traveled by said agitator.

7. The structure specified in claim 6 in which said injection means comprise a bushing mounted in the bottom of the vessel and a nozzle mounted in said bushing.

8. The structure specified in claim 7 in which the agitation means are rotatably mounted adjacent the bottom of the vessel to revolve about said nozzle.

9. The structure specified in claim 8 in which the agitation means comprise a baffle plate mounted on the nozzle above the opening therein and in which the agitation means are mounted on said baffle to generate a vortex motion in the substance to be treated.

10. The structure specified in claim 7 in which the nozzle is rotatably mounted in said bushing and in which the agitation means are mounted on said nozzle to generate a vortex motion in the substance to be treated and which includes means for rotating said nozzle.

11. The structure specifed in claim 7 in which the bushing is rotatably mounted in the bottom of said vessel and in which the agitation means are mounted on said bushing to generate a vortex motion in the substance to be treated and which includes means for rotating said bushing.

* * * * *

UNITED STATES PATENT OFFICE
CERTIFICATE OF CORRECTION

Patent No. __3,746,314__ Dated __July 17, 1973__

Inventor(s) __Constant Johan Nauta__

It is certified that error appears in the above-identified patent and that said Letters Patent are hereby corrected as shown below:

On the cover sheet:

Before "[52]" insert:

--[30]     Foreign Application Priority Data

January 9, 1970     Dutch........70 00259.--

Signed and sealed this 8th day of January 1974.

(SEAL)
Attest:

EDWARD M. FLETCHER, JR.  RENE D. TEGTMEYER
Attesting Officer  Acting Commissioner of Patents